United States Patent
Moon et al.

(10) Patent No.: US 11,674,038 B2
(45) Date of Patent: Jun. 13, 2023

(54) RESIN COMPOSITION FOR GOLF BALL COVER

(71) Applicants: NEXEN CORPORATION, Gyeongsangnam-do (KR); SUNGJOO T&C CO., LTD., Busan (KR)

(72) Inventors: Jung Gyu Moon, Seoul (KR); Yong Woo Shin, Gyeongsangnam-do (KR); Young Ig Keown, Busan (KR)

( * ) Notice: Subject to any disclaimer, the term of this patent is extended or adjusted under 35 U.S.C. 154(b) by 0 days.

(21) Appl. No.: 17/770,992

(22) PCT Filed: Jul. 1, 2021

(86) PCT No.: PCT/KR2021/008326
§ 371 (c)(1),
(2) Date: Apr. 21, 2022

(87) PCT Pub. No.: WO2022/005219
PCT Pub. Date: Jan. 6, 2022

(65) Prior Publication Data
US 2022/0356350 A1   Nov. 10, 2022

(30) Foreign Application Priority Data

Jul. 2, 2020 (KR) .................. 10-2020-0081338
Jun. 30, 2021 (KR) .................. 10-2021-0085231

(51) Int. Cl.
*C08L 75/04* (2006.01)
*A63B 37/00* (2006.01)
*C08L 83/04* (2006.01)

(52) U.S. Cl.
CPC .......... *C08L 75/04* (2013.01); *A63B 37/0023* (2013.01); *C08L 83/04* (2013.01)

(58) Field of Classification Search
CPC ............ C08G 18/281; C08G 18/2815; C08G 18/289; C08G 18/4238; C08G 18/3206; B05D 2503/00
See application file for complete search history.

(56) References Cited

U.S. PATENT DOCUMENTS

2005/0009992 A1   1/2005   Voorheis

FOREIGN PATENT DOCUMENTS

| JP | 2616630 B2 | 6/1997 |
| JP | 2000051403 A | 2/2000 |
| JP | 4031330 B2 | 1/2008 |
| JP | 4414059 B2 * | 11/2009 |
| JP | 8-117361 A | 9/2014 |
| KR | 1020140092575 | 3/2005 |

OTHER PUBLICATIONS

JP 4414059 B2 machine translation (2009).*
Mitsubishi Chemical Group (https://www.m-chemical.co.jp/en/products/departments/mcc/c4/product1201008_7922.html)(date unknown).*
PCT/KR2020/008326 Search Report dated Jul. 1, 2021, 3 pages.

* cited by examiner

*Primary Examiner* — Kuo Liang Peng
(74) *Attorney, Agent, or Firm* — Nolte Lackenbach Siegel; Myron Greenspan

(57) ABSTRACT

The present disclosure provides a resin composition for a golf ball cover. The resin composition includes a thermoplastic polyurethane resin including 55 to 70 parts by weight of a polyol, 30 to 40 parts by weight of an isocyanate, and 0.2 to 0.4 parts by weight of a polysiloxane. The polysiloxane includes at least one hydroxyl group or a carboxyl group in the terminal alkyl group. The polyol and the isocyanate constitute a silicone-free thermoplastic polyurethane resin, and the polysiloxane and the isocyanate constitute a thermoplastic polyurethane resin that includes silicone in the main chain, thereby improving the scuff resistance and slip property required for a golf ball cover.

5 Claims, No Drawings

RESIN COMPOSITION FOR GOLF BALL COVER

TECHNICAL FIELD

The present disclosure relates to a resin composition applicable to a golf ball cover, the resin composition being obtained by adding polysiloxane when synthesizing a thermoplastic polyurethane resin.

BACKGROUND ART

A golf ball consists of a core and a cover surrounding the core. When manufacturing a golf ball, an ionomer resin with excellent durability has been used the most as a material for the golf ball cover. However, since the ionomer resin has a hard property when the ionomer resin is used as a golf ball cover material, there is a problem that the spin force of the golf ball decreases.

A thermosetting polyurethane resin may be used in place of the ionomer resin. However, the thermosetting polyurethane resin does not provide sufficient physical properties to satisfy the cut resistance and repulsion properties required in the golf ball. Accordingly, many studies have been made to use a thermoplastic polyurethane resin as a material for a golf ball cover instead of a thermosetting polyurethane resin. However, when only a thermoplastic polyurethane resin is used as a material for a golf ball cover, there is a limit in that it cannot withstand the scuff resistance required for the golf ball cover.

DISCLOSURE

Technical Problem

An objective of the present disclosure is to provide a resin composition capable of improving the scuff resistance of the golf ball cover, that is, the tear prevention performance due to impact when hitting a golf ball by a golf club.

Technical Solution

The resin composition of the present disclosure includes a thermoplastic polyurethane resin containing 55 to 70 parts by weight of a polyol, 30 to 40 parts by weight of an isocyanate, and 0.2 to 0.4 parts by weight of a polysiloxane, wherein the polysiloxane has a structure of Formula 1. In Formula 1, n is a number, R is an alkyl group, Me is a methyl group, and X is an alkyl group, including at least one hydroxyl group or a carboxyl group.

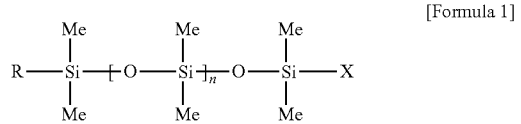

[Formula 1]

Preferably, X in Formula 1 may include 1 to 3 hydroxyl or carboxyl groups.

Preferably, X in Formula 1 may further include at least one ester group or an ether group.

Preferably, the polyol and the isocyanate may constitute a silicone-free thermoplastic polyurethane resin, and the polysiloxane and the isocyanate may constitute the thermoplastic polyurethane resin that includes silicone in the main chain.

Preferably, the polyol may be at least one selected from the group consisting of ethylene glycol, diethylene glycol, triethylene glycol, 1,3-butanediol, 1,4-butanediol, neopentyl glycol, 1,6-hexanediol, glycerin, trimethylolpropane, hexanetriol, polyoxyethylene glycol (PEG), polyoxypropylene glycol (PPG), polytetramethylene ether glycol (PTMEG), polyethylene adipate (PEA), polybutylene adipate (PBA), polyhexamethylene adipate (PHMA), poly-ε-caprolactone (PCL), and polyhexamethylene carbonate (PCD).

Preferably, the isocyanate may be at least one selected from the group consisting of 1,5 naphthalene diisocyanate (NDI), paraphenylene diisocyanate (PPDI), tolidine diisocyanate (TODI), diphenylmethane diisocyanate (MDI), toluene diisocyanate (TDI), hexamethylene diisocyanate (HDI), dicydohexylmethane diisocyanate (H12MDI), and isophorone diisocyanate (IPDI).

Preferably, the polyol may include polytetramethylene ether glycol (PTMEG) and 1,4-butanediol, and the isocyanate may be monomeric diphenylmethane diisocyanate (MDI).

Preferably, the polyol includes 56 parts by weight of polytetramethylene ether glycol (PTMEG) and 9 parts by weight of 1,4-butanediol, and the isocyanate may be composed of 35 parts by weight of monomeric diphenylmethane diisocyanate (MDI).

Preferably, the polysiloxane may have a structure of formula 2.

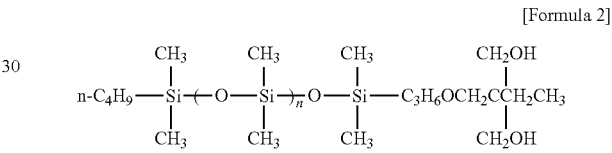

[Formula 2]

where n is a number.

Advantageous Effects

The present disclosure can improve the scuff resistance required for a golf ball cover by adding polysiloxane when synthesizing a thermoplastic polyurethane resin and improve slip properties.

BEST MODE

Hereinafter, the present disclosure will be described in detail. However, the present disclosure is not limited or limited by the exemplary embodiments. Objectives and effects of the present disclosure can be naturally understood or made dearer by the following description, and the objectives and effects of the present disclosure are not limited only by the following description. In addition, in describing the present disclosure, if it is determined that a detailed description of a known technology related to the present disclosure may unnecessarily obscure the gist of the present disclosure, the detailed description thereof will be omitted.

The present disclosure is to provide a resin composition for golf ball cover, the composition includes a thermoplastic polyurethane resin containing 55 to 70 parts by weight of a polyol, 30 to 40 parts by weight of an isocyanate, and 0.2 to 0.4 parts by weight of a polysiloxane, wherein the polysiloxane has the structure of Formula 1. In Formula 1, n is a number, R is an alkyl group, Me is a methyl group, and X is an alkyl group, including at least one hydroxyl group or a carboxyl group.

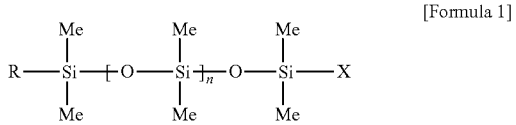

[Formula 1]

In the present disclosure, a thermoplastic polyurethane resin is firstly synthesized in which unreacted isocyanate remains in the synthesis of the thermoplastic polyurethane resin, and unreacted isocyanate and polysiloxane are additionally reacted. The reaction referred to herein refers to a urethane polymerization reaction between an isocyanate and a polysiloxane. Accordingly, in the present disclosure, a thermoplastic polyurethane resin including silicone in the main chain may be synthesized, and a resin composition for a golf ball cover of the present disclosure may include all of silicone-free thermoplastic polyurethane resin and the thermoplastic polyurethane resins including silicone. The amount of unreacted isocyanate may be the same as or greater than the amount of polysiloxane, and the amount is based on the number of moles (mol).

When the thermoplastic polyurethane resin is prepared, 30 to 40 parts by weight of isocyanate may be added. Isocyanates constitute a hard segment in the polyurethane resin. The isocyanate may be added in consideration of the molar ratio of the reaction with the polyol and the molar ratio of the reaction with the polysiloxane.

The isocyanate may be used as the same one used in the preparation of conventional polyurethane. Aromatic isocyanates, aliphatic isocyanates, or substituted aliphatic isocyanates are exemplified. Preferably the isocyanate may be at least one selected from the group consisting of 1,5 naphthalene diisocyanate (NDI), paraphenylene diisocyanate (PPDI), tolidine diisocyanate (TODI), diphenylmethane diisocyanate (MDI), toluene diisocyanate (TDI), hexamethylene diisocyanate (HDI), dicyclohexylmethane diisocyanate (H12MDI), and isophorone diisocyanate (IPDI).

When the thermoplastic polyurethane resin is prepared, 55 to 70 parts by weight of polyol may be added. Polyols constitute a soft segment in the polyurethane resin. When the polyol is added in an amount of less than 55 parts by weight, hardness may be excessively increased, and when added in an amount of more than 70 parts by weight, hardness may be excessively decreased.

The polyol may be at least one selected from the group consisting of ethylene glycol, diethylene glycol, triethylene glycol, 1,3-butanediol, 1,4-butanediol, neopentyl glycol, 1,6-hexanediol, glycerin, trimethylolpropane, hexanetriol, polyoxyethylene glycol (PEG), polyoxypropylene glycol (PPG), polytetramethylene ether glycol (PTMEG), polyethylene adipate (PEA), polybutylene adipate (PBA), polyhexamethylene adipate (PHMA), poly-ε-caprolactone (PCL), and polyhexamethylene carbonate (PCD).

When the thermoplastic polyurethane resin is prepared, 0.2 to 0.4 parts by weight of polysiloxane may be added. The amount of polysiloxane to be added may be determined based on 100 parts by weight of the thermoplastic polyurethane resin. When polysiloxane is added in an amount of less than 0.2 parts by weight, the effect of improving slip properties and scuff resistance may not appear or may appear insignificant. When 0.2 to 0.4 parts by weight of polysiloxane are added, the effect of improving slip properties and scuff resistance may appear. When more than 0.4 parts by weight of polysiloxane are added, slip properties and scuff resistance may deteriorate.

Polysiloxane may have a structure of the following [Formula 1]. In Formula 1, R may be an alkyl group, Me may be a methyl group.

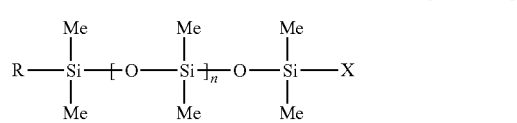

[Formula 1]

In Formula 1, X may be an alkyl group, including at least one hydroxyl group or a carboxyl group. X in Formula 1 may include 1 to 3 hydroxyl groups or carboxyl groups and preferably includes 1 or 2 hydroxyl or carboxyl groups. X in Formula 1 may further include at least one ester group or an ether group. In Formula 1, n is a number whereby the polysiloxane has an average molecular weight 600 to 7000 g/mol.

Polysiloxane may be at least one selected from the group consisting of Silaplane FM-DA11, Silaplane FM-DA21, Silaplane FM-0411, Silaplane FM-0421, Silaplane FM-0428, Silaplane FM-0611, Silaplane FM-0621, FM-0625, and Silaplane DA-25 manufactured by Chisso Corporation.

A method of applying the resin composition for a golf ball cover to a golf ball cover according to the present disclosure may be a method of injection molding the extruded and pelletized polysiloxane to a golf ball cover, in which polysiloxane is made into a masterbatch and mixed with a thermoplastic polyurethane resin to extrude and pelletize, or may be a method of directly mixing a thermoplastic polyurethane resin with a polysiloxane, extruding and pelletizing the mixture, and injection molding with a golf ball cover.

Hereinafter, Examples and Comparative Examples of the present disclosure will be described. The method of synthesizing the thermoplastic polyurethane resin according to the present disclosure is as follows.

1. Polytetramethylene ether glycol (PTMEG) [Manufacturer: Korea PTG, Product Name: Polytetramethylene ether glycol] and 1,4-butanediol [Manufacturer. Korea PTG, Product Name: 1,4-Butanediol] was heated to 60° C., put into the first container, and mixed for 5 minutes.

2. Monomeric diphenylmethane diisocyanate (MDI) [Manufacturer: Korea PTG, Product Name: COSMONATE PH] and modified polysiloxane [manufacturer: Chisso Corporation, product name: SILAPLANE FM-DA11] was heated to 60° C., put into the second container, and mixed for 5 minutes. The added polysiloxane has the structural formula shown in following [Formula 2].

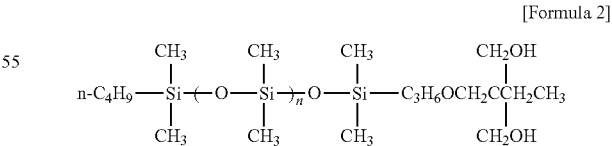

[Formula 2]

where is a number.

3. A thermoplastic polyurethane resin was synthesized by mixing PTMEG and 1,4-butanediol in the first container and MDI and polysiloxane in the second container, and the thermoplastic polyurethane resin was extruded and pelletized, and injection molded into a golf ball cover. The golf ball core was manufactured by a method known in the golf ball manufacturing field.

4. A total of three Examples (Examples 1 to 3) and a total of four Comparative Examples (Comparative Examples 1 to 4) were prepared through the processes of 1 to 3 described above, and the configuration of each Example and Comparative Example is shown in Table 1. However, since polysiloxane was not added during the preparation of Comparative Example 1, a thermoplastic polyurethane resin was synthesized by raising the temperature of PTMEG and 1,4-butanediol to 60° C., putting into a first container and mixing for 5 minutes, and raising the temperature of MDI to 60° C. to put into a first container and mixing.

TABLE 1

| Division | Comparative Example 1 | Comparative Example 2 | Example 1 | Example 2 | Example 3 | Comparative Example 3 | Comparative Example 4 |
| --- | --- | --- | --- | --- | --- | --- | --- |
| PTMEG | 6000 | 6000 | 6000 | 6000 | 6000 | 6000 | 6000 |
| 1.4BD | 941 | 941 | 941 | 941 | 941 | 941 | 941 |
| MDI | 3680 | 3680 | 3680 | 3680 | 3680 | 3680 | 3680 |
| FM-DA11 | 0 | 10.6 | 21.2 | 31.9 | 42.5 | 53.1 | 318.6 |

In Table 1, each addition amount of PTMEG, 1,4 BD, MDI, and FM-DA11 are in gram (g) units. Referring to Table 1, 6000 g of PTMEG were added to each Example and Comparative Example, and since the molecular weight of PTMEG was 1500 g/mol, 4 mols of PTMEG were added accordingly. 941 g of 1,4 BD were added to each Example and Comparative Example, and since the molecular weight of 1,4 BD was 90.12 g/mol, accordingly about 10.44 mols of 1,4 BD were added. 3680 g of MDI were added to each Example and Comparative Example, and since the molecular weight of MDI was 250 g/mol, accordingly about 14.72 mols of MDI were added. It may be seen that 100 parts by weight of the thermoplastic polyurethane resin include 56 parts by weight of PTMEG, 9 parts by weight of 1,4 BD, and 35 parts by weight of MDI. The amount of polysiloxane added is shown in Table 2, and the unit in Table 2 is parts by weight or phr.

TABLE 2

| Division | Comparative Example 1 | Comparative Example 2 | Example 1 | Example 2 | Example 3 | Comparative Example 3 | Comparative Example 4 |
| --- | --- | --- | --- | --- | --- | --- | --- |
| FM-DA11 | 0 | 0.1 | 0.2 | 0.3 | 0.4 | 0.5 | 3 |

Table 3 shows the evaluation results of physical properties of Examples 1 to 3 and Comparative Examples 1 to 4 of the present disclosure. The physical properties to be evaluated are slip property, hardness, 100% Modulus, 300% Modulus, tensile strength, and scuff resistance. The slip property evaluation evaluates the coefficient of kinetic friction (p) of the golf ball cover, and the evaluation standard is in accordance with ASTM D 1894:01. The hardness evaluation (Shore A) is in accordance with ASTM D2240, and the evaluation of 100% Modulus (Kgf/cm$^2$), 300% Modulus (Kgf/cm$^2$), and tensile strength (Kgf/cm$^2$) is in accordance with ASTM D412.

Scuff resistance evaluation was performed in a manner that 52 degrees Wedge Iron dub mounted on the robot striker (Mechanical Tester) and hitting each golf ball three times. A different part was hit within each golf ball, and the head speed was set to 35 m/s. The degree of damage to the cover of the golf ball hitting part was evaluated relative to give a score. A state in which the cover was dug, and there was no surface part was rated as 1 (Worst), and a state without damage to the cover was rated as 5 (Best).

TABLE 3

| Division | Slip property | Hardness | 100% Modulus | 300% Modulus | The tensile strength | Scuff resistance |
|---|---|---|---|---|---|---|
| Comparative Example 1 | 1.15 | 94A | 90 | 150 | 450 | 3.5 |
| Comparative Example 2 | 1.03 | 94A | 101 | 179 | 535 | 4.0 |
| Example 1 | 1.02 | 94A | 100 | 175 | 535 | 4.5 |
| Example 2 | 0.99 | 94A | 96 | 176 | 537 | 4.5 |
| Example 3 | 0.97 | 94A | 95 | 180 | 545 | 4.5 |
| Comparative Example 3 | 0.97 | 94A | 90 | 167 | 516 | 4.0 |
| Comparative Example 4 | 0.92 | 94A | 62 | 96 | 248 | 4.0 |

Referring to Table 3, as the amount of polysiloxane is increased, the slip property is improved, while it can be seen that the hardness is constant. Comparing Comparative Example 1 and Comparative Example 2, it can be confirmed that 100% Modulus, 300% Modulus, and tensile strength are increased by adding polysiloxane, whereas comparing Example 3, Comparative Example 3, and Comparative Example 4, it can be seen that 100% Modulus, 300% Modulus, and tensile strength decrease by adding polysiloxane in excess of 0.4 phr.

Comparing the evaluation results of the scuff resistance of Comparative Examples 1 and 2, it can be confirmed that the scuff resistance is improved by the addition of polysiloxane. Comparing the evaluation results of the scuff resistance of Comparative Example 2 and Example 1, it can be seen that the scuff resistance is further improved by further adding 0.1 phr of polysiloxane, preferably, adding 0.2 phr of polysiloxane. Referring to the results of the scuff resistance of Examples 2 and 3, it can be seen that the same results as the results of the scuff resistance of Example 1 are obtained. Comparing the evaluation results of the scuff resistance of Example 3, Comparative Example 3, and Comparative Example 4, it can be seen that the scuff resistance is lowered by adding the polysiloxane in excess of 0.4 phr.

Although the present disclosure has been described in detail through representative embodiments, a person skilled in the art will understand that various modifications to the above-described embodiments may be made without departing from the scope of the present disclosure. Therefore, the scope of the present disclosure should not be limited to the described embodiments but should be defined by all changes or modifications derived from the claims and equivalent concepts as well as the claims to be described later.

The invention claimed is:

1. A resin composition for a golf ball cover, the composition comprising a thermoplastic polyurethane resin comprising, with respect to 100 parts by weight of the thermoplastic polyurethane resin, 55 to 70 parts by weight of polyol, 30 to 40 parts by weight of isocyanate, and 0.2 to 0.4 parts by weight of polysiloxane, wherein the polysiloxane has the following structure:

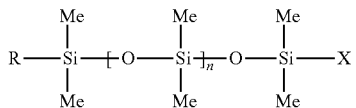

where n is a number, R is an alkyl group, Me is a methyl group, and X is an alkyl group containing at least one hydroxyl or carboxyl group whereby the polysiloxane has a weight average molecular weight of 600 to 7,000 g/mol, wherein the polyol and the isocyanate constitute a silicone-free thermoplastic polyurethane resin, and the polysiloxane and the isocyanate constitute a thermoplastic polyurethane resin comprising silicon in a main chain thereof, wherein the polyol comprises polytetramethylene ether glycol (PTMEG) and 1,4-butanediol, and the isocyanate is monomeric diphenylmethane diisocyanate (MDI).

2. The resin composition of claim 1, wherein X is an alkyl group comprising 1 to 3 hydroxyl groups or carboxyl groups.

3. The resin composition of claim 2, wherein X further comprises at least one ester group or an ether group.

4. The resin composition of claim 1, wherein the polyol comprises 56 parts by weight of polytetramethylene ether glycol (PTMEG) and 9 parts by weight of 1,4-butanediol, and the isocyanate is contained in an amount of 35 parts by weight and is composed of monomeric diphenylmethane diisocyanate (MDI).

5. The resin composition of claim 4, wherein the polysiloxane has the following structure:

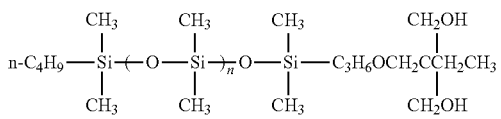

where n is a number whereby the polysiloxane has a weight average molecular weight of 600 to 7,000 g/mol.

* * * * *